(No Model.)

N. H. ROBERTS.
ROTARY PLOW.

No. 506,443. Patented Oct. 10, 1893.

WITNESSES:
F. W. Warner.
J. A. Walsh.

INVENTOR
Nate H. Roberts,
BY Chester Bradford,
ATTORNEY.

UNITED STATES PATENT OFFICE.

NATE H. ROBERTS, OF INDIANAPOLIS, INDIANA, ASSIGNOR TO ELIAS C. ATKINS, OF SAME PLACE.

ROTARY PLOW.

SPECIFICATION forming part of Letters Patent No. 506,443, dated October 10, 1893.

Application filed May 23, 1893. Serial No. 475,249. (No model.)

*To all whom it may concern:*

Be it known that I, NATE H. ROBERTS, a citizen of the United States, residing at Indianapolis, in the county of Marion and State of Indiana, have invented certain new and useful Improvements in Rotary Plows, of which the following is a specification.

The object of my said invention is to provide the diagonally set plowing disks of rotary plows with ball bearings, in a manner which shall be efficient and durable.

It consists in a peculiar construction and arrangement of parts, whereby superior results are attained, as will be hereinafter more particularly described and claimed.

Figure 1:
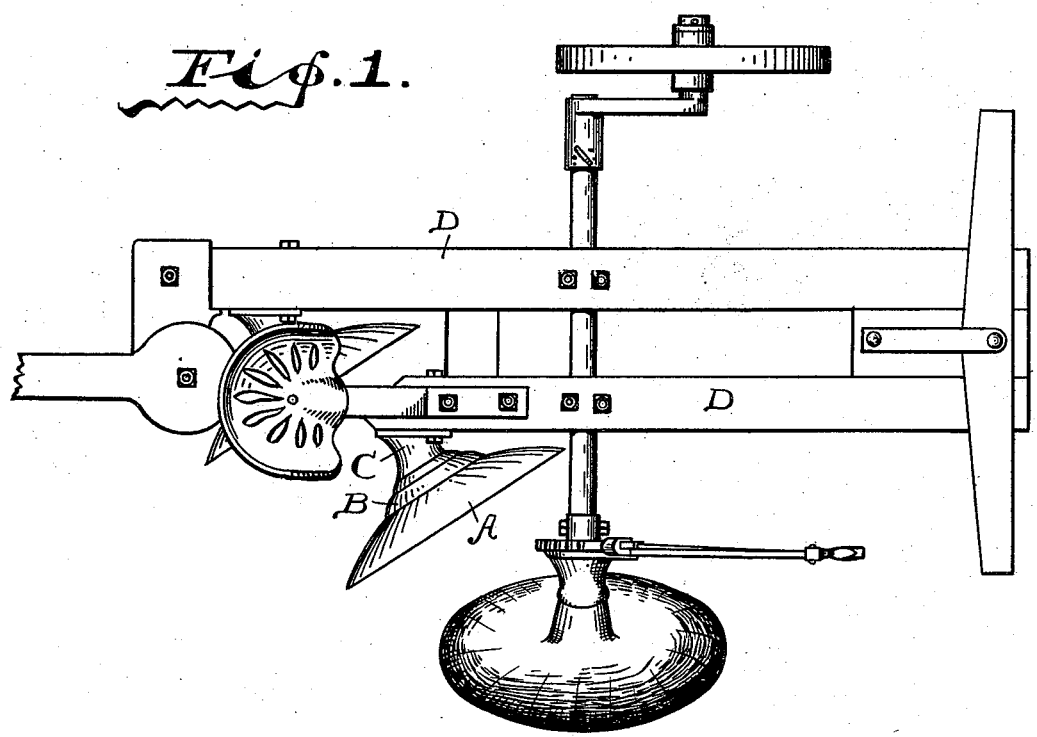
Figure 2:
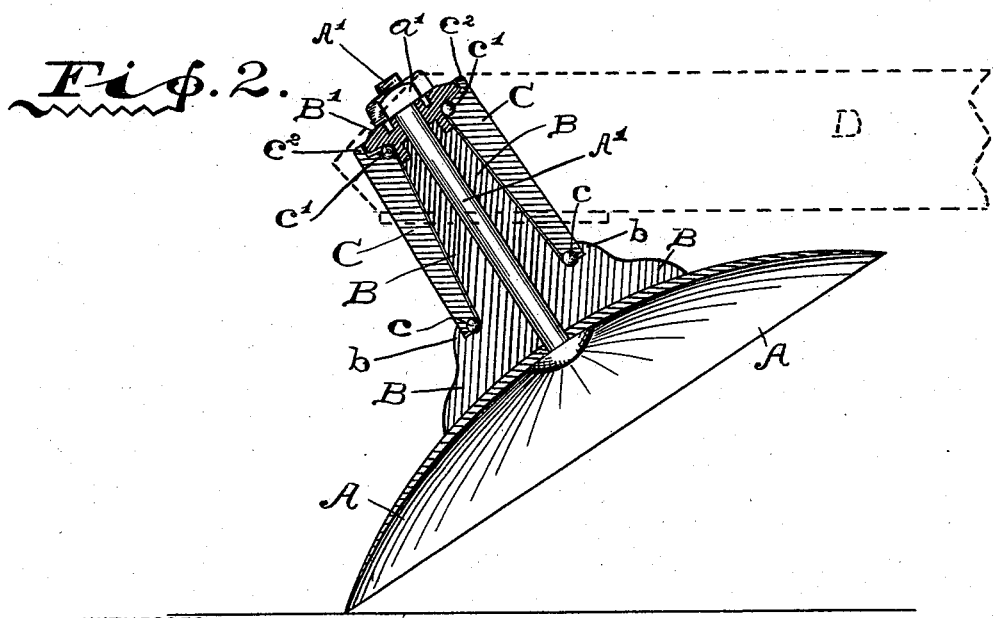

Referring to the accompanying drawings, which are made a part hereof, and on which similar letters of reference indicate similar parts, Figure 1 is a top or plan view of a rotary plow embodying my said invention, and Fig. 2 a horizontal sectional view through the plowing disk, on an enlarged scale.

In said drawings the portion marked A represent the plowing disk; B the spindle secured thereto; C the bearing in which said spindle runs, and D the frame-work of the plow. All of these parts, except so far as relates to the construction of the spindles to the plowing disks, and the bearings therefor, are or may be of any usual or desired construction, and as they form no part of my present invention, will not be further described herein, except incidentally in describing said invention. The spindle B is fixedly secured to the back side of the plowing disk A and extends through the bearing C, which is secured to the frame work B, all as shown, and as will be readily understood. Said spindle has a flange $b$ which surrounds a projecting end of the bearing C and acts as a dirt guard. A groove is formed under said flange for the reception of the balls $c$. Said bearing end is also grooved and extends over and rests upon the outside of said balls, all as shown in Fig. 2. At the outer end, the spindle is reduced in size somewhat, and is provided with a cap B′ which is formed to pass under the balls $c'$ which are placed at this end, and the bearing C is flanged and grooved to cover said balls, and to act as a dirt guard at this point. The flange $c^2$ preferably projects far enough to cover the cap B′. The spindle is slightly smaller than the orifice through the bearing, and the grooves are so formed that the balls will keep the surfaces of the spindle and bearing apart, as shown in said Fig. 2. As shown, the plowing disk A is held to the spindle B by a bolt A′ which passes through said disk and spindle and the cap B′ is held by a nut $a'$ on the outside of said cap. As will be seen, the cap is screwed onto the spindle, and holds the spindle and bearing together, as the cap projects out into the recess under the flange $c^2$ on said bearing. The cap, being under the nut $a'$, is provided with perforations, so that it may be turned on by means of a wrench having projections. The disk can be removed, therefore, without disassembling the other parts, by simply taking out the bolt A′. This is of advantage, as it is desirable frequently to change the disks, while the remaining parts are rarely disturbed, and if it was necessary to take the spindle out, the balls would necessarily fall out, and be in danger of being lost.

As will be noticed on examination of Fig. 1, the plowing disks are set diagonally to the line of draft, and, therefore, the strain comes upon the balls and bearings diagonally. By the peculiar formation of the parts, as shown, and above described, the balls are adapted to take this diagonal strain, which they would not do in an ordinary ball bearing. The grooves are so formed that the bearing surface for the balls in the groove in the spindle extends beyond the centers of said balls on one side, and the bearing surface for the balls in the groove in the bearing extends beyond their centers on the other side, thus providing proper bearings in both directions.

Having thus fully described my said invention, what I claim as new, and desire to secure by Letters Patent, is—

1. The combination, in a rotary plow, with the plowing disks having a spindle attached thereto and provided with flanges and grooves as described, of a bearing, also provided with flanges and grooves, through which said spindle passes, and a cap also provided with a groove secured upon the outer end of the spindle and passing within the surrounding bearing and against the balls, substantially as shown and described.

2. The combination, in a rotary plow, with a plowing disk set diagonally to the line of draft, a spindle centrally attached thereto, a bearing therefor secured to the frame work of the plow, and adapted to receive said spindle, said bearing and said spindle being provided with grooves and flanges, balls interposed between them in said grooves, and a cap secured upon the outer end of the spindle, all substantially as shown and described.

3. The combination, in a rotary plow, of the plowing disk, the spindle, a bearing surrounding said spindle, balls interposed between said spindle and said bearing, a cap B' screwed onto the end of said spindle and holding the parts together, and a bolt A' passing through the disk the spindle and said cap and holding said plowing disk onto said spindle, substantially as shown and described.

In witness whereof I have hereunto set my hand and seal, at Indianapolis, Indiana, this 19th day of May, A. D. 1893.

NATE H. ROBERTS. [L. S.]

Witnesses:
CHESTER BRADFORD,
JAMES A. WALSH.